US006582668B2

(12) United States Patent
Green

(10) Patent No.: US 6,582,668 B2
(45) Date of Patent: Jun. 24, 2003

(54) BUOYANT DISPENSING DEVICE

(76) Inventor: Ivan L. Green, 29961 Northbrook, Farmington Hills, MI (US) 48334

( * ) Notice: Subject to any disclaimer, the term of this patent is extended or adjusted under 35 U.S.C. 154(b) by 0 days.

(21) Appl. No.: 09/891,855

(22) Filed: Jun. 25, 2001

(65) Prior Publication Data

US 2002/0197197 A1 Dec. 26, 2002

(51) Int. Cl.[7] .......................... B01D 11/02; E04H 3/16; E03B 11/00; E03D 9/02; A62C 5/02
(52) U.S. Cl. ................... 422/265; 422/264; 422/264 B; 210/169; 210/192; 210/198.1; 137/268; 239/310; 222/477; 221/15; 4/227.1; 4/229
(58) Field of Search .................. 422/264–265, 422/264 B, 311, 271–276, 292, 296–299, 902; 210/169, 192, 198.1, 206, 242.1; 137/268; 239/310; 222/476–477; 221/15; 4/223, 223.1, 226.1, 227.1, 229–230

(56) References Cited

U.S. PATENT DOCUMENTS

| 2,546,317 A | 3/1951 | Prizer .............................. 47/1 |
| 2,934,409 A | 4/1960 | Biehl .......................... 23/267 |
| 3,474,806 A | 10/1969 | Coldren et al. ............... 137/13 |
| 3,598,536 A | 8/1971 | Christensen ............... 23/267 A |
| 3,684,460 A | 8/1972 | Arneson .................... 23/267 A |
| 3,753,659 A | 8/1973 | Raubenheimer .......... 23/267 A |
| 3,792,979 A | 2/1974 | Clinton ...................... 23/267 A |
| 4,826,591 A | 5/1989 | Macia ......................... 210/169 |
| 5,165,119 A | 11/1992 | Yamato ......................... 4/309 |
| 5,795,551 A | 8/1998 | Powell ....................... 422/264 |

Primary Examiner—Robert J. Warden, Sr.
Assistant Examiner—Monzer R. Chorbaji
(74) Attorney, Agent, or Firm—Vanophem & Vanophem, PC

(57) ABSTRACT

A buoyant dispensing device for dispensing a material into a body of water. An inner receptacle contains the material and has apertures to permit the material to escape therefrom. A housing having an outer receptacle houses the inner receptacle therein and has corresponding apertures. The inner and outer receptacles are rotatable and fixable with respect to one another to enable a varying degree of overlap between the apertures to control the amount of material dispensed therethrough. Vanes circumscribe the receptacles and corresponding spokes and guard rings interconnect the receptacles and the vanes and keep the receptacles spaced a predetermined distance from other objects. The vanes absorb an impulse force from the body of water and impart the impulse force to the receptacles in the form of a rotational reaction force whereby the dispensing device rotationally and linearly displaces itself within the body of water.

19 Claims, 3 Drawing Sheets

BUOYANT DISPENSING DEVICE

CROSS-REFERENCES TO RELATED APPLICATIONS

Not applicable.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to floating or buoyant dispensing devices. More specifically, this invention relates to a buoyant chlorine dispenser for controlled dispensing of chlorine into a swimming pool, wherein the dispenser is specifically designed to avoid interfering with a skimmer device of the swimming pool.

2. Description of the Related Art

Buoyant chlorine dispensers for chlorinating swimming pools are well known. Typically, such dispensers are essentially hollow floating receptacles that store a supply of chlorine in crystal or tablet form therein. The receptacles enable discharge of metered amounts of chlorine through small apertures in the receptacle. Generally, such dispensers float near the surface of the water in the swimming pool and move across the swimming pool in accordance with the flow of the water therein or in response to wind acting thereupon. Unfortunately, however, such dispensers often get swept into the immediate vicinity of swimming pool skimmers.

Swimming pool skimmers are typically built-in to a swimming pool and are located near or at the water's surface. A typical swimming pool includes a recirculating pump that pulls deep water through drains located in the bottom of the pool and that pulls surface water through the skimmer. To cause surface water to move from the rest of the swimming pool into the skimmer, a significant stream or flow of surface water must be pulled to and through the skimmer.

This flow of surface water tends to pull a free-floating chlorine dispenser into the immediate vicinity of the skimmer and entrap it there in place, thereby leading to several problems. Firstly, typical floating chlorine dispensers tend to inhibit or block the flow of surface water through the skimmer, thereby causing the recirculating pump to cavitate or at least to be impaired or operate inefficiently. Secondly, this flow of surface water can unnecessarily accelerate the dispensing of the chlorine from the dispenser by constant agitation of water passing through the dispenser on its way to the skimmer. Thirdly, chlorine receptacles of typical free-floating dispensers periodically bump into the side of the pool and cause immediate and direct contact of chlorine therewith, thereby staining or fading the sides of the pool. The following prior art patents are illustrative of these typical free-floating dispensers: U.S. Pat. No. 2,934,409 to Biehl; U.S. Pat. No. 3,598,536 to Christensen; U.S. Pat. No. 3,792,979 to Clinton; and U.S. Pat. No. 5,795,551 to Powell.

From the above, it can be appreciated that the free-floating chlorine dispensers of the prior art are not fully optimized and are susceptible to impeding the flow of surface water into a skimmer of a swimming pool. Therefore, what is needed is a free-floating chlorine dispenser for a swimming pool that does not impede the flow of surface water to a skimmer, is not susceptible to accelerated dissolution of chlorine therefrom, and maintains a receptacle a predetermined distance from the sides of a swimming pool.

BRIEF SUMMARY OF THE INVENTION

According to the preferred embodiment of the present invention there is provided a unique dispensing device for use in a body of fluid. The dispensing device includes inner and outer receptacle members for containing a medium therein and for dispensing the medium into the body of fluid. Reaction members are provided to absorb an input force from the body of fluid, wherein offset members connect the receptacle members to the reaction members and thereby space the reaction members from the receptacle members. In operation, the reaction members absorb the input force from the body of fluid and impart the input force to the receptacle members in the form of a rotational reaction force whereby the dispensing device is rotationally and linearly displaced within the body of fluid.

Accordingly, it is an object of the present invention to provide a dispensing device that will automatically displace itself out of the vicinity of a skimming device of a swimming pool by absorbing and converting an impulse force from the body of water to a rotational reaction force whereby the dispensing device rotates and translates.

It is another object to provide a dispensing device that maintains the receptacle portion of the device a predetermined distance away from and out of contact with another object.

It is a still another object to provide a dispensing device that permits easy adjustment of the receptacle portion of the device to selectively meter and release a medium housed therein.

It is yet another object to provide a dispensing device having adjustable vane members thereon.

These objects and other features, aspects, and advantages of this invention will be more apparent after a reading of the following detailed description, appended claims, and accompanying drawings.

DETAILED DESCRIPTION OF THE PREFERRED EMBODIMENT

Figure 1:
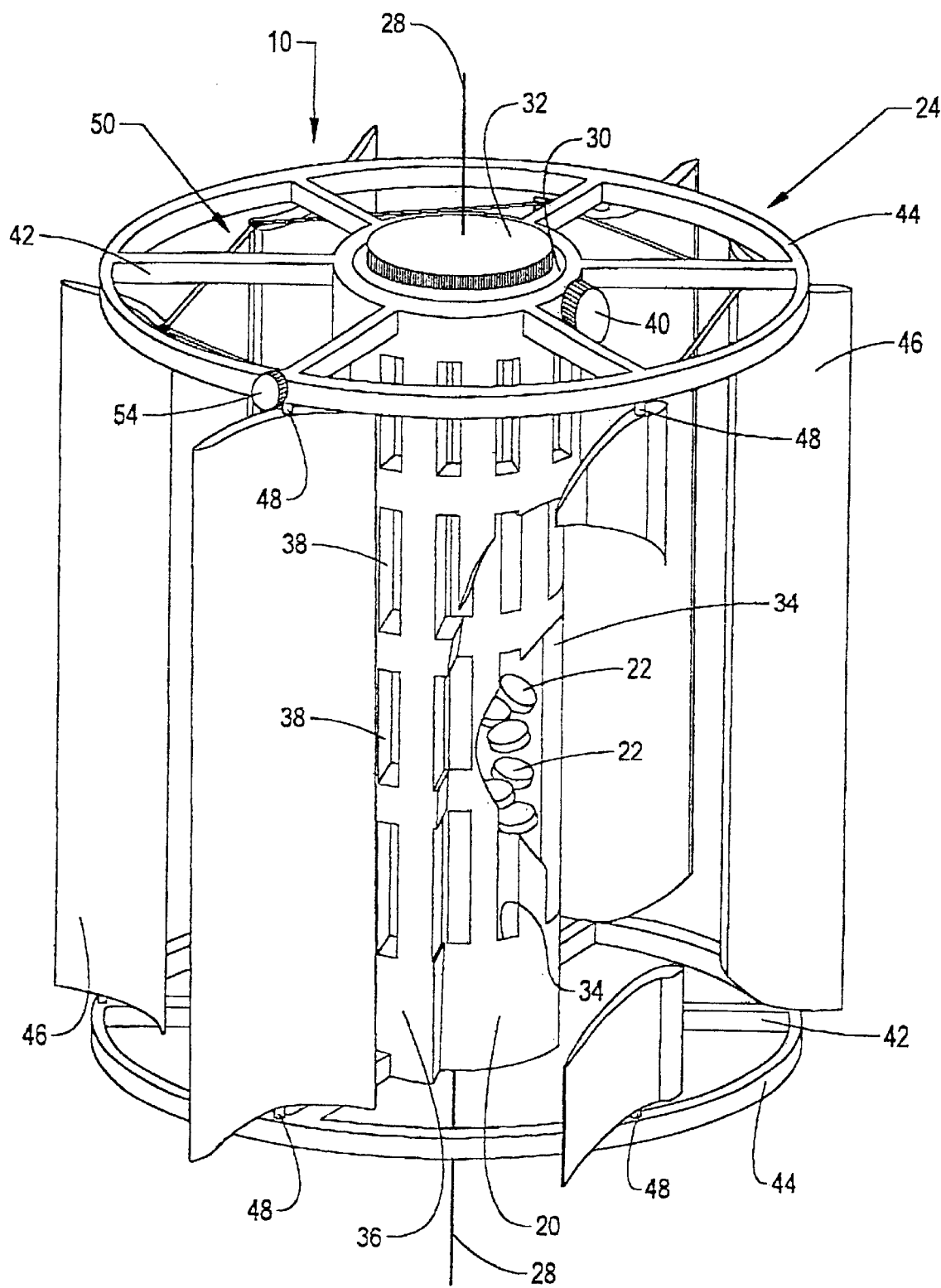
FIG. 1 is a partially broken away perspective view of the dispensing device of the present invention.

Referring now in detail to the Figures, there is shown in FIG. 1 a dispensing device 10 in accordance with the preferred embodiment of the present invention. In general, the dispensing device 10 is used to release a dissolvable medium, such as chlorine, continuously and at an adjustably controlled rate into a body of fluid, such as a swimming pool, in which the dispensing device 10 is placed. The dispensing device 10 generally includes an inner receptacle 20 for holding a supply of media such as chlorine tablets 22, a housing 24 surrounding the inner receptacle 20, and a multitude of vanes 46. The dispensing device 10 has a central longitudinal axis 28 that remains vertically upright when the dispensing device 10 is disposed within the swimming pool 12.

One or more of the above-mentioned components is composed of a buoyant material such as rigid foam that is well known to those of ordinary skill in the art of constructing buoyant devices. Preferably, any kind of polymeric material can be used that is either of open or closed-cell foam construction that entraps air or gas within the polymeric material for keeping the dispensing device 10 afloat in a body of fluid, preferably water in a swimming pool. Further, the components are preferably injection molded or blow-molded in the case of the inner receptacle 20, but may be manufactured in accordance with any well-known method. Such material selection and manufacturing methods are well within the ordinary skill in the art and need not be discussed further herein.

Still referring to FIG. 1, the inner receptacle 20 is shaped as a bottle-like cylindrical vessel having one open end 30 to which a lid 32 is removably attached by any well-known method such as threading or snap fitting. The lid 32 is removable to permit filling the inside of the inner receptacle 20 with the chlorine tablets 22, and reattachable to close the inner receptacle 20. The chlorine tablets 22 are preferably sized such that their outer diameter's closely match, but fit within, the inner diameter of the inner receptacle 20, such that the chlorine tablets 22 form a stack. FIG. 1, however, shows alternative chlorine tablets 22 of smaller size that are commonly used in prior art chlorine dispensers. The inner receptacle 20 includes apertures 34 of any reasonable number, size, and shape, but preferably the apertures 34 are rectangular extending length-wise along the general longitudinal axis 28 of the dispensing device 10 and are sized in proportion to the chlorine tablets 22 such that the chlorine tablets 22 will not pass therethrough in whole.

The inner receptacle 20 is surrounded and supported by a corresponding portion of the housing 24 referred to as an outer receptacle 36, such that the inner receptacle 20 is assembled into the outer receptacle 36. The outer receptacle 36 is also cylindrically shaped, open ended, and includes apertures 38 therein that correspond to the apertures 34 of the inner receptacle 20. The fit between the inner and outer receptacles 20 and 36 is snug, but loose enough to permit hand rotating the inner receptacle 20 relative to the outer receptacle 36 to adjust the overlap of the apertures 34 and 38. The overlap of the apertures 34 and 38 is thereby adjustable to control the volume of fluid passing into and out of the apertures 34 and 38 to thus selectively control the amount of chlorine dispensed from the dispensing device 10. A setscrew 40 locks the inner receptacle 20 with respect to the outer receptacle 36 wherein the setscrew 40 is screwed through the outer receptacle 36 and is jammed tightly upon the inner receptacle 20 so as to prevent relative movement therebetween. Such setscrew arrangements are very well known to those of ordinary skill in any mechanical art.

The outer receptacle 36 provides a hub-like structure for the housing 24 wherein an upper and lower array of equally spaced spokes 42 extend integrally and radially outwardly therefrom. Each array of spokes 42 terminates in an integral guard ring 44 circumscribing the outer receptacle 36 and thus completes a wagon wheel like structure of the housing 24. Accordingly, the spokes 42 provide a full circumferential standoff or offset between the receptacles 20 and 36 and the outer diameter of the housing 24 defined by the guard ring 44 to maintain the receptacles 20 and 36 a predetermined distance from and clear of another object, such as a sidewall of a swimming pool.

Between the upper and lower arrays of spokes 42 and guard rings 44 there is mounted an array of equally spaced longitudinally extending blades or vanes 46. The vanes 46 are pivotably mounted between the guard rings 44 by integral shafts 48 or shaft portions integrally extending from the vanes 46 into corresponding holes (not shown) in the guard rings 44. The vanes 46 are assembled to the housing 24 simply by inserting the shaft 48 at one end of the vane 46 into its corresponding hole in the guard ring 44, deflecting the opposite guard ring 44, and fitting the shaft 48 at the opposite end of the vane 46 into the corresponding hole in the opposite guard ring 44. Alternatively, the vanes 46 could be formed integrally with the rest of the housing 24, but would be fixed in position. Preferably, however, the vanes 46 are independent of the housing 24 and interconnected by a linkage 50 attached to one end of each of the vanes 46, such linkage 50 being well known in any mechanical art.

Figure 2:
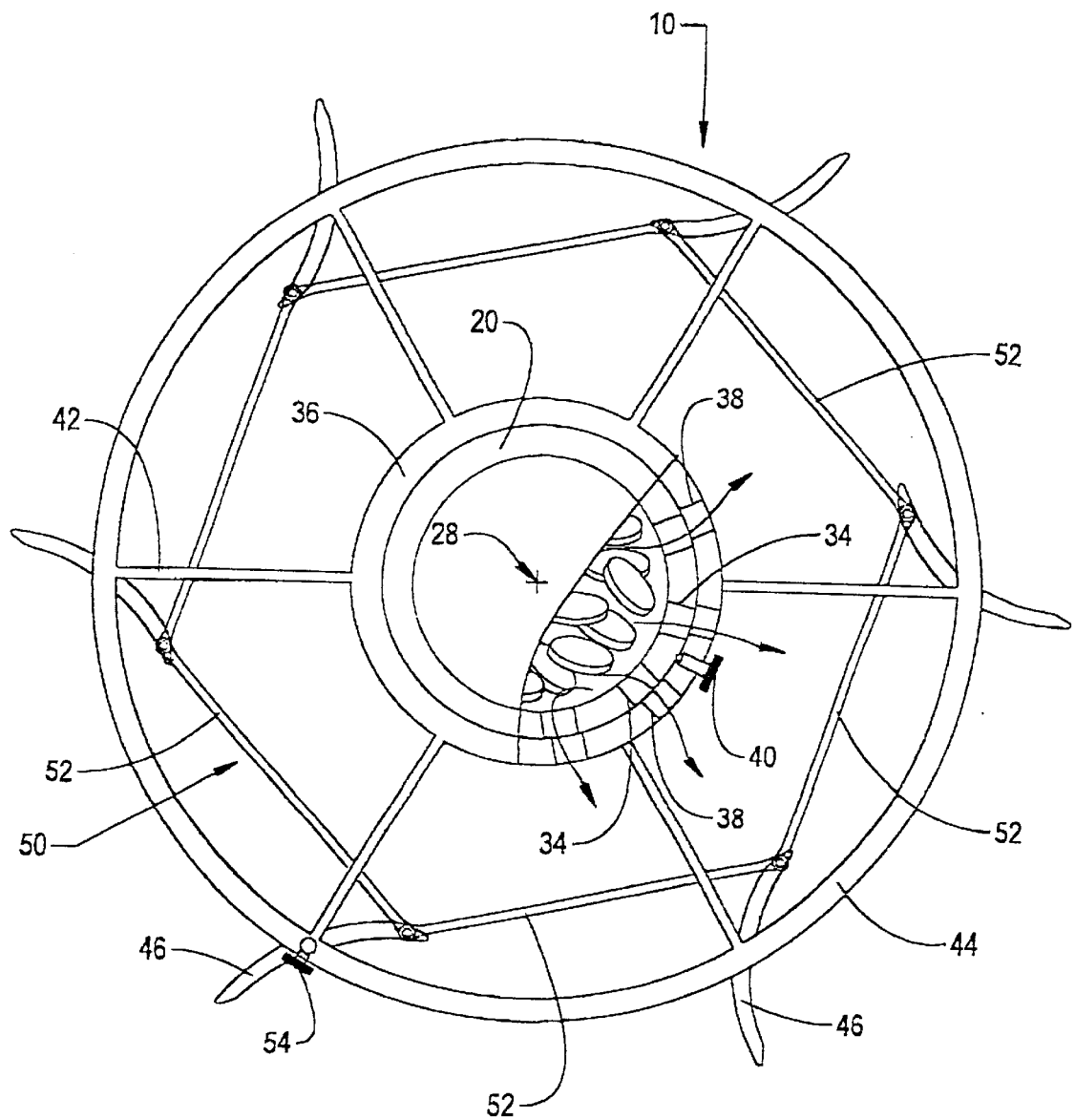
FIG. 2 is a top view of the dispensing device of FIG. 1.

FIG. 2 better illustrates the linkage 50 that interconnects the vanes 46. Each vane 46 includes a linkage member 52 that is pivotably attached to a corner portion thereof as shown and well known, extended toward the adjacent vane, and attached to a corresponding corner portion of an adjacent vane 46. Thus a complete 360° linkage 50 is formed. The vanes 46 are thereby adjustable in unison and a setscrew 54 is used to fix the position of one of the vanes 46, thereby fixing the position of the rest of the vanes 46. Again, such a setscrew arrangement is very well known in any mechanical art and need not be dwelled upon here.

Also shown in FIG. 2 is the relationship between the apertures 38 of the outer receptacle 36 with respect to the apertures 34 of the inner receptacle 20. The apertures 34 and 38 are shown almost entirely overlapped so as to reduce the full dispensing capability of the dispensing device 10 to dispense chlorine therefrom in proportion to the percentage overlap of the apertures 34 and 38. Accordingly, the apertures 34 and 38 may be completely overlapped in full alignment, partially overlapped, or blocked and not overlapped at all, so as to respectively produce between 100% and 0% dispensing capability.

FIG. 2 also best shows the preferred shape and orientation of the vanes 46. The vanes 46 are preferably concave-convex in shape and are oriented with the concave portion of the vanes 46 facing relatively radially outward with respect to the longitudinal axis 28 of the dispensing device 10. Alternatively, the vanes 46 can be shaped flat or can be angled longitudinally with respect to the longitudinal axis 28 of the dispensing device 10.

Figure 3:
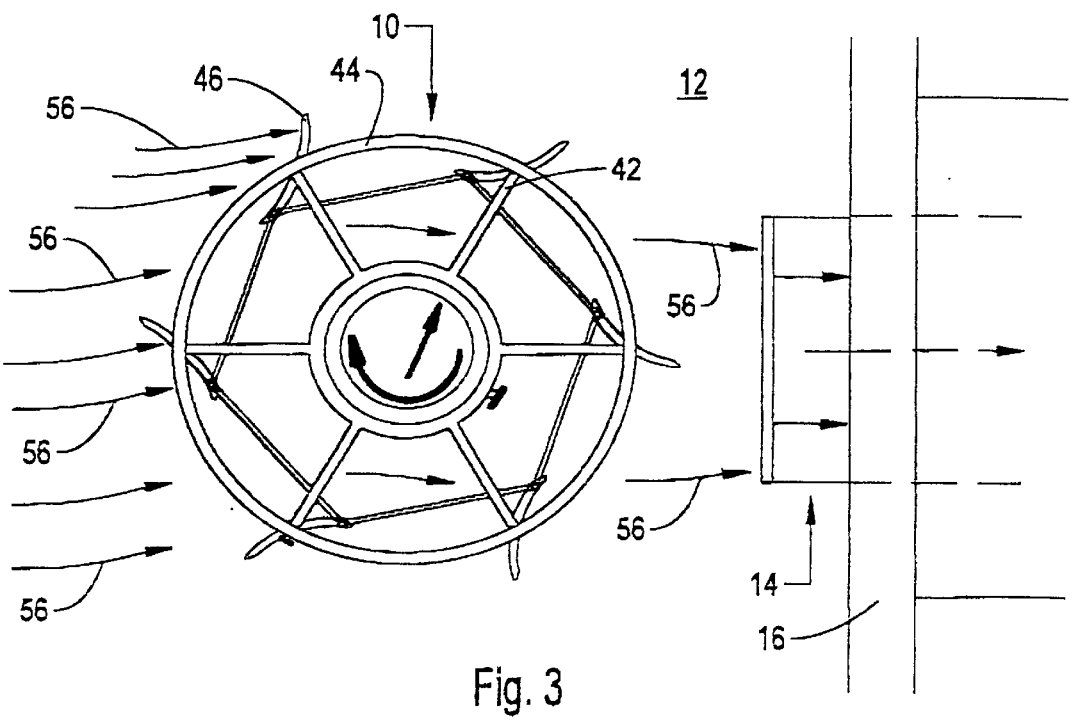
FIG. 3 is a top view of the dispensing device of FIG. 1 shown in a swimming pool in front of a skimmer.

FIG. 3 illustrates the use of the dispensing device 10 in a typical situation in a swimming pool 12 that was discussed in detail in the background section. As with the prior art, the dispensing device 10 of the present invention is placed in the swimming pool 12, floats within and migrates around the swimming pool 12, and eventually is pulled into the flow of water flowing into a skimmer 14.

In contrast, however, the present invention enables the dispensing device 10 to escape the immediate vicinity of the skimmer 14 such that it will not block the flow of water flowing into the skimmer 14. Fluid pressure energy in the form of a stream of fluid is converted to mechanical velocity energy by the dispensing device 10 through the principles of impulse. Specifically, principles of hydro-kinetic impulse apply to the present invention wherein the dispensing device 10 behaves like a free-floating version of a vane-type anemometer or hydraulic turbine. In other words, a generally linearly flowing stream of water acts on the dispensing device 10 wherein the dispensing device 10 absorbs the potential energy of the flowing stream and converts that energy into rotational and translational kinetic energy of the dispensing device 10 itself.

Figure 4:
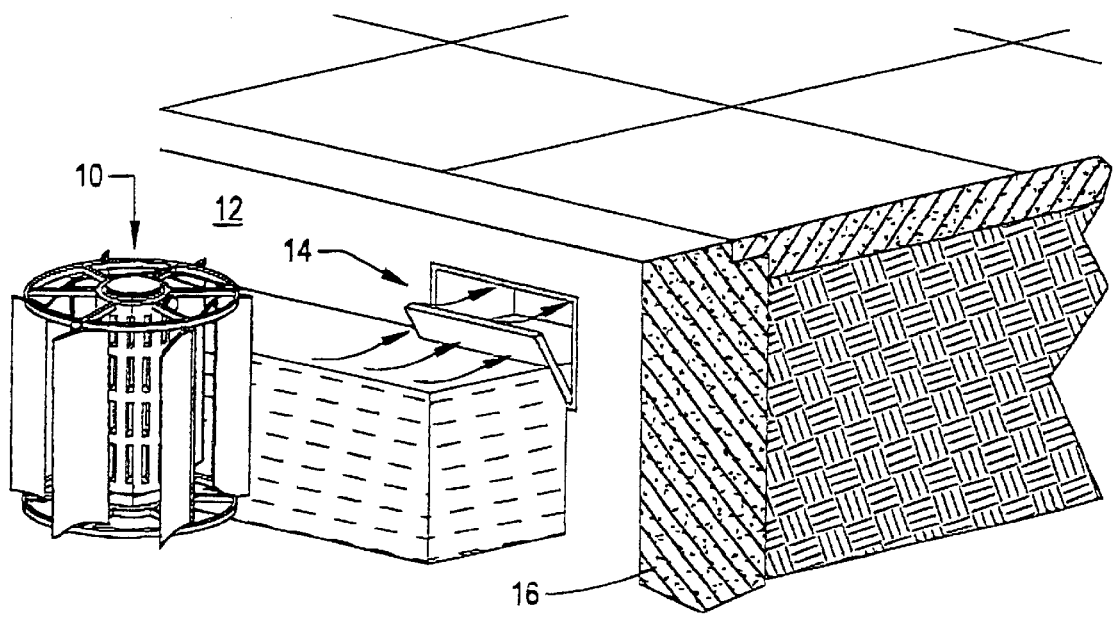
FIG. 4 is a perspective view of the dispensing device of FIG. 1 shown in the swimming pool and shown sweeping away from the front of the skimmer.

The flow or stream of water, as shown by arrows 56, impinges on the vanes 46 much in the same way as wind impinges upon the vanes of an anemometer. The vanes 46 respond by tangentially absorbing the linear hydrokinetic impulse, input force, or input pressure of the stream of water 56 and by imparting the linear impulse to the housing 24, thereby developing a torque or rotational reaction force about the longitudinal axis of the dispensing device 10 and thus causing the dispensing device 10 to rotate. In other words, the dispensing device 10 is impelled to rotate about its longitudinal axis and translate out of the way of the skimmer 14. As a result, and as shown in FIG. 4, the dispensing device 10 rotationally and linearly displaces itself off to one side of the skimmer 14 in the swimming pool 12.

Referring back to FIG. 1, adjustment of the vanes 46 is effected by loosening the setscrew 54, rotating the vanes 46 about their shafts 48, and resetting the setscrew 54 to lock the vanes 46 in place. Adjustment of the vanes 46 yields greater or lesser surface area of the vanes 46 exposed to the stream of water, thereby altering the capability of the dispensing device 10 to convert linear hydrokinetic energy into rotational energy. Thus, the consequent effect is to optimize the rotational and linear displacement of the dispensing device 10.

Referring again to FIG. 2 and as is well known, the stream of water 56 flows into the apertures 38 and 34 of the outer and inner receptacles 36 and 20, impinges upon the chlorine tablets 22 and thereby slowly dissolves and mixes with the chlorine tablets 22, and flows out of the apertures 34 and 38 whereby a release of chlorine is achieved from the dispensing device 10. Uniquely, however, the present invention allows for a selectively controlled release of chlorine by adjusting the overlap of the apertures 34 and 38 of the receptacles 20 and 36 as described previously. In other words, increasing the amount of overlap of the apertures 34 and 38 proportionally increases the output of chlorine.

As is also well known, dispensing devices generally come into contact with sidewalls 16 of swimming pools 12 during migration of the dispensing device 10 around the swimming pool 12. Uniquely, however, the present invention prevents immediate contact of the receptacles 20 and 36 with the sidewall 16 of the pool by providing a standoff configuration in the form of the spokes 42 and guard ring 44. The spokes 42 and guard ring 44 set the receptacles 20 and 36 a predetermined distance off from the sidewall 16 of the swimming pool 12 to avoid damage thereto. Fortunately, however, flow of water 56 can still flow around the spokes 42 and guard ring 44 to surge against the receptacles 20 and 36 for generating chlorinating action as described previously.

While the present invention has been described in terms of a preferred embodiment, it is apparent that other forms could be adopted by one skilled in the art. For example the teachings of the present invention encompass any reasonable substitutions or equivalents of claim limitations hereof. Examples include integrating the inner and outer receptacles 20 and 36 into a one-piece component, using other geometry and orientation for the vanes including a cup-shaped configuration, and using a single array of spokes and guard ring in the middle of the dispensing device instead of both an upper and lower array. Those skilled in the art will appreciate that other applications, including those outside of the swimming pool industry, are possible with this invention. Accordingly, the present invention is not limited to only chlorine dispensers and is to be limited only by the following claims.

What is claimed is:

1. A device for dispensing a medium into a body of fluid, said dispensing device comprising:

means for containing said medium and dispensing said medium into said body of fluid;

means for absorbing an input force from said body of fluid, said means for absorbing being located so as to surround said means for containing and dispensing said medium;

means for converting said input force into rotational movement, said means for converting circumscribing said means for containing and dispensing said medium; and means for spacing said means for containing and dispensing said medium with respect to said means for absorbing;

whereby said means for absorbing absorbs said input force from said body of fluid and said means for converting imparts said input force to said means for containing and dispensing said medium in the form of a rotational reaction force such that said device rotationally and linearly displaces itself in said body of fluid while dispensing said medium.

2. The device as claimed in claim 1, further comprising at least one guard ring circumscribing said means for storing and dispensing said medium and connecting to said means for spacing to provide a full circumferential standoff to maintain said means for storing and dispensing said medium a predetermined distance from another object.

3. The device as claimed in claim 1, wherein said means for spacing comprises at least one array of spokes integrally extending radially outward from said means for containing and dispensing said medium.

4. The device as claimed in claim 3, wherein said at least one array of spokes comprises an upper array of spokes and a lower array of spokes spaced longitudinally away from said upper array of spokes.

5. The dispensing device as claimed in claim 1, wherein said means for absorbing comprises an array of vane-like members adjustably mounted to said means for spacing, whereby the orientation of said array of vane-like members is adjustable to optimize rotational and linear displacement of said device.

6. The device as claimed in claim 5, wherein said vane-like members each have the same curved concave-convex shape.

7. The device as claimed in claim 1, wherein said means for containing and dispensing comprises an inner receptacle and an outer receptacle, said inner and outer receptacles each having a plurality of apertures therein.

8. The device as claimed in claim 7, wherein said inner and outer receptacles are moveable with respect to one another to permit alignment, overlap, and blockage of said plurality of apertures to selectively dispense said medium from within said device.

9. The device as claimed in claim 8, wherein said inner receptacle includes a lid for closing said medium therewithin.

10. A buoyant dispensing device for dispensing a material into a body of water, said buoyant dispensing device comprising:

at least one receptacle for containing said material and dispensing said material into said body of water;

at least one array of vanes circumscribing said at least one receptacle, said at least one array of vanes for absorbing an impulse force from said body of water; and at least one array of spokes interconnecting said at least one receptacle and said at least one array of vanes, said at least one array of spokes extending radially outwardly from said at least one receptacle to said at least one array of vanes;

wherein said at least one array of vanes absorbs said impulse force from said body of water and imparts said impulse force to said at least one receptacle in the form of a rotational reaction force, such that said buoyant dispensing device rotationally and linearly displaces itself within said body of water and said at least one receptacle is maintained a predetermined distance away from another object.

11. The buoyant dispensing device as claimed in claim 10, wherein said at least one array of spokes comprises an upper array of spokes and a lower array of spokes, further wherein said at least one array of vanes correspondingly extends longitudinally therebetween.

12. The buoyant dispensing device as claimed in claim 10, wherein said at least one array of spokes is integrally interconnected to said at least one receptacle as a one-piece molded component.

13. The buoyant dispensing device as claimed in claim 10, further comprising at least one guard ring circumscribing said at least one receptacle, said at least one guard ring interconnecting the spokes of said at least one array of spokes, and said at least one guard ring providing a full circumferential standoff to maintain said at least one receptacle a predetermined distance from another object.

14. The buoyant dispensing device as claimed in claim 10, wherein the vanes of said at least one array of vanes are adjustable such that the orientation of the vanes of said at least one array of vanes can be adjusted.

15. The buoyant dispensing device as claimed in claim 10, wherein the vanes of said at least one array of vanes are curved in a concave-convex shape for optimizing absorption of and reaction to hydrokinetic forces impinging thereupon.

16. The buoyant dispensing device as claimed in claim 10, wherein said at least one receptacle comprises an inner tubular receptacle and an outer tubular receptacle that are rotatable with respect to one another, said inner and outer tubular receptacles each having apertures therethrough that overlap to permit escape of said material from within said at least one receptacle into said body of water.

17. The buoyant dispensing device as claimed in claim 16, wherein said inner tubular receptacle of said at least one receptacle includes a lid for closing said material within said at least one receptacle.

18. A buoyant chlorine dispenser for treating a swimming pool having a skimmer and a flow of water toward and through said skimmer, said buoyant chlorine dispenser comprising:

an inner receptacle for containing said chlorine, said inner receptacle having an open end into which said chlorine is inserted, said inner receptacle further having apertures therethrough for permitting said chlorine to escape from said inner receptacle;

an outer receptacle for housing said inner receptacle therein, said outer receptacle having apertures therethrough for permitting said chlorine to escape from said outer receptacle;

said inner and outer receptacles being rotatable and fixable with respect to one another so as to enable a varying degree of overlap between said apertures thereof to selectively control the amount of dispensing capability of said buoyant chlorine dispenser;

at least one array of vanes circumscribing said inner and outer receptacles, said at least one array of vanes for absorbing an impulse force from said flow of water within said swimming pool;

at least one array of spokes interconnecting said outer receptacle and said at least one array of vanes, said at least one array of spokes extending radially outwardly from said outer receptacle to said at least one array of vanes; and at least one guard ring circumscribing said outer receptacle and interconnecting the spokes of said at least one array of spokes;

whereby said at least one array of vanes absorbs said impulse force from said flow of water and imparts said impulse force to said outer receptacle in the form of a rotational reaction force such that said buoyant chlorine dispenser rotationally and linearly displaces itself from said flow of water flowing into said skimmer.

19. The buoyant chlorine dispenser as claimed in claim 18, wherein said at least one array of vanes is adjustably mounted to said at least one guard ring such that the orientation of said at least one array of vanes can be adjusted, and further wherein each vane of said at least one array of vanes is adjusted in unison with each and every other vane of said at least one array of vanes.

* * * * *